United States Patent [19]
Marten

[11] Patent Number: 5,880,228
[45] Date of Patent: Mar. 9, 1999

[54] HARDENERS FOR EPOXY RESIN SYSTEMS, WHICH ARE FORMED FROM EPOXY, MONOHYDROXY AROMATIC, AND AMINE ADDUCTS

[75] Inventor: Manfred Marten, Mainz, Germany

[73] Assignee: Vianova Resins GmbH, Mainz-Kastel, Germany

[21] Appl. No.: 903,942

[22] Filed: Jul. 31, 1997

[30] Foreign Application Priority Data

Aug. 2, 1996 [DE] Germany .................. 196 31 370.8

[51] Int. Cl.⁶ ............................................ C08F 283/00
[52] U.S. Cl. ........................ 525/524; 525/526; 525/533; 528/93; 528/103; 528/113
[58] Field of Search .................... 525/524, 526, 525/533; 528/93, 103, 113

[56] References Cited

U.S. PATENT DOCUMENTS

| | | | |
|---|---|---|---|
| 3,383,347 | 5/1968 | Pettit | 260/28 |
| 3,625,918 | 12/1971 | Heer et al. | 260/47 |
| 3,751,471 | 8/1973 | Becker | 260/570.5 |
| 4,399,268 | 8/1983 | Becker et al. | 528/99 |
| 5,576,108 | 11/1996 | Neumann et al. | 428/413 |

FOREIGN PATENT DOCUMENTS

| | | |
|---|---|---|
| 0 068 263 | 1/1983 | European Pat. Off. . |
| 0 253 339 | 1/1988 | European Pat. Off. . |

*Primary Examiner*—Randy Gulakowski
*Attorney, Agent, or Firm*—Foley & Lardner

[57] ABSTRACT

Hardeners for epoxy resins include a reaction product of (A) a compound having an average of at least one 1,2-epoxide group per molecule, compound (A) being a reaction products of (A1) a polyfunctional epoxide having ate least two 1,2-epoxide groups per molecule of said epoxide and (A2) a monohydroxyaromatic compound, and (B) an amine. Epoxy resins cured with the hardeners are useful as coatings.

20 Claims, No Drawings

HARDENERS FOR EPOXY RESIN SYSTEMS, WHICH ARE FORMED FROM EPOXY, MONOHYDROXY AROMATIC, AND AMINE ADDUCTS

BACKGROUND OF THE INVENTION

Epoxy resins, especially those prepared from bisphenol A and epichlorohydrin, are known base materials for the production of high-quality casting resins and coating compositions. These aromatic epoxy resins, cured using amines, generally possess not only good chemical and solvent resistance but also good adhesion to numerous substrates. Bisphenol A epoxy resins which can be processed without the use of a solvent and have a very low viscosity are accorded particular importance, for example for the protection and renovation of concrete structures, as concrete additives such as for epoxide cement concrete (ECC field), for elastic adhesive systems in various fields of application, and for the coating of a wide variety of substrates. When amines are used, the epoxy resins can generally be cured at ambient temperature.

The use of Mannich bases of polyamines, phenols and formaldehyde is known for example, from U.S. Pat. No. 3,383,347, EP-A 0 042 617, U.S. Pat. No. 3,751,471, EP-A 0 068 263 and EP-A 0 253 339. With these products it is possible to produce, at low temperatures, thoroughly cured epoxy coatings which feature high pendulum hardnesses after a short drying time. The phenolic hydroxyl groups of the free or bonded phenolic structures are responsible for the accelerating effect.

One disadvantage of these systems is the more or less high content of free phenol, which greatly restricts the use of the hardeners due to environmental legislation and regulations.

EP-A 0 645 408 describes phenol-free hardeners having very good low-temperature properties. These epoxy systems cure rapidly, thus leaving the processor relatively little time for application. As described in Table 1 of EP-A 0 645 408 the pot life of such phenol-free hardeners is from 15 to 20 minutes.

There is a desire for systems having good low-temperature properties, i.e., those capable of rapid and complete drying at temperatures below 10° C. so as to form coatings of high pendulum hardness, but which permit a relatively long processing time. At the same time, such hardeners are required to have a relatively low viscosity, i.e., below 5000 mPa·s at 25° C., and to form a coating with a surface that is free from clouding and is insensitive to water.

SUMMARY OF THE INVENTION

It is an object of the present invention to provide improved hardeners for epoxy resins, and methods of making and using the hardeners. In accordance with these objectives, there is provided a hardener suitable for use in epoxy resins, comprising a reaction products of (A) a compound having an average of at least one 1,2-epoxide group per molecule, the compound (A) being a reaction product of
(A1) a polyfunctional epoxide having at least two 1,2-epoxide groups per molecule of the epoxide and
(A2) a monohydroxyaromatic compound, and
(B) an amine.

Further objects, features, and advantages of the invention will become apparent from the detailed description that follows.

DETAILED DESCRIPTION OF A PREFERRED EMBODIMENT

It has been found, surprisingly, that by subjecting monohydroxyaromatic compounds to an addition reaction with polyepoxides aromatic hydroxy-functional epoxide, compounds are formed which can be processed with excess amine to give relatively low-viscosity hardeners which have the required properties.

It is particularly surprising that, in contrast to what has been assumed to date, no phenolic hydroxyl groups are required in order to obtain these low-temperature properties. This makes it possible to prepare low-phenol, that is, a hardener having a residual proportion of phenol <0.1% by mass, or even possibly phenol-free products. Furthermore, the chemical-resistant coatings and moldings obtained with these hardeners are superior in their properties to traditional epoxy-amine adduct hardeners and when used with the majority of solvents are equal to Mannich base hardeners.

Even at low temperatures of <10° C. and after just 24 hours, the cured coats have pendulum hardnesses which are far above those obtained with epoxy-amine adduct hardeners.

The novel hardeners can be prepared, for example, by heating the polyfunctional epoxides (A1) and the monohydroxyaromatic compounds (A2) under an inert gas atmosphere, with or without the addition of catalysts. The reaction is preferably continued until the epoxide group content has reached a constant value, in general, approximately the theoretical value. Following the reaction of the polyepoxides with the monohydroxy-aromatic compounds, the reaction products may in some cases still include small amounts of unreacted hydroxyaromatic compounds. These are preferably removed by vacuum distillation or, if desired, with optionally appropriate entrainers. Suitable entrainers include those generally known in the art to work for such purposes. After removal, there is no formation of free phenol because the addition of phenol to epoxide compounds is irreversible.

The obtained adduct (A) is diluted if desired with benzyl alcohol, for example, to an extent such that its viscosity is generally appropriate for the next reaction stage intended. Instead of benzyl alcohol, other relatively nonvolatile solvents or alcohols such as methoxypropanol or phenylethanol, for example, can also be employed. The mass ratio of benzyl alcohol to adduct is preferably usually from 1:2 to 1:5. The adduct solution is reacted under hot (about 60° to about 190° C.) conditions with a pure or diluted polyamine (B), preferably until all of the epoxide groups have reacted. The specific content of active amine hydrogen groups in the reaction product of (A) and (B) is preferably between 8 and 20 mol/kg, with particular preference between 10 and 18 mol/kg.

Any desired epoxide (A1) can be used. Particularly suitable polyfunctional epoxides (A1) include epoxy resins based on bisphenol A and/or bisphenol F, and also glycidyl esters of polybasic carboxylic acids. Preference is given to glycidyl ethers of polyhydric alcohols having 2 to 20 carbon atoms or mono- or polycyclic phenols having at least two phenolic hydroxyl groups per molecule, and to the polycondensates based on novolak resins. The latter are particularly preferred for the invention, especially novolaks having at least two hydroxyl groups, based on phenol, cresol, other alkylphenols having at least two reactive positions ortho or para to the phenolic hydroxyl group and having 1 to 8 carbon atoms in the alkyl groups, and aldehydes selected from aliphatic aldehydes having 1 to 8 carbon atoms. Particularly preferred components (A1) therefore include glycidyl ethers of novolaks having at least two glycidyl ether groups.

Any desired monohydroxyaromatic compounds (A2) can be used. Suitable monohydroxyaromatic compounds (A2)

include, in particular, monocyclic hydroxyaromatic compounds, such as phenol itself, at least monosubstituted phenols, such as o-, m- and p-cresol, 2,6-xylenol and its isomers, guaiacol, thymol, carvacrol, p-tert-butyl-phenol, halogenated phenols, more highly substituted alkylphenols having 1 to 20 carbon atoms per alkyl substituent, alkoxyphenols preferably having 1 to 8 carbon atoms per substituent, where the alkyl and alkoxy groups can be linear or branched, aryl-linked phenols whose aryl radical can in turn optionally be substituted by such alkyl and/or alkoxy radicals, the aryl radical being linked to the phenol via a bridge selected from a direct bond or an ether, thioether, carbonyl, sulfonyl, alkylene, carboxamide and carbonyloxy bridge, such as, for example, polycyclic unfused phenols, such as 2- and 4-phenylphenol, and polycyclic fused phenols, such as 2- and 1-naphthol.

These components (A1) and (A2) are preferably employed in amounts such that component (A) has on average more than one epoxide group per molecule, in particular from 1.3 to 2.7 epoxide groups per molecule. With particular preference there are from 1.5 to 2.5, especially from 1.7 to 2.2, epoxide groups per molecule of component (A).

Within the scope of the invention component (A) can also optionally be blended with epoxy resins (A') which are different from (A) and which likewise preferably contain at least two epoxide groups per molecule, in particular with epoxy resins based on bisphenol A or bisphenol F. Such blends are particularly preferred if component (A1) is a glycidyl ether of a novolak having at least two glycidyl ether groups. Component (A') may be selected in particular from glycidyl ethers of bisphenol A and bisphenol F and their reaction products with further bisphenol A or bisphenol F, having a specific epoxide group content of preferably from 4500 to 6000 mmol/kg. In this case, the mass fraction of component (A) in such a blend is preferably at least 50%, more preferably at least 65% and, with particular preference, at least 80%, based on the mass of the mixture of (A) and the other optional epoxy resins (A').

Any desired amine (B) can be used. Suitable amines (B) preferably have at least one primary amino group or at least one primary and at least one secondary amino group per molecule. The amino groups are preferably attached to aliphatic carbon atoms. Preference is given to diamines having two primary amino groups, which may additionally comprise further secondary or tertiary amino groups.

Suitable diamines include alkylenediamines derived from alkanes having 2 to 20 carbon atoms, such as ethylenediamine, 1,2- and 1,3-propylenediamine, 1,4-diaminobutane, 1,5-diaminopentane, 1,6-diaminohexane, 2,2,4- and 2,4,4-trimethyl-1,6-diaminohexane, isophoronediamine, 1,2- and 1,4-bis(aminomethyl) cyclohexane, aminoethylpiperazine and the isomeric xylylenediamines, and also polyiminoalkylenediamines, whose alkylene groups can be ethylene or propylene groups or mixtures thereof, such as diethylenetriamine, triethylenetetramine, tetraethylenepentamine and pentaethylenehexamine, and the polyoxyalkylenediamines, such as those offered under the trade name "®Jeffamine D series" by Huntsman Chemical. Particular preference is given to isophoronediamine, m-xylylenediamine, aminoethylpiperazine and mixtures of these amines with other amines, in which case the former amines are in each case preferably present in the mixture in proportions by mass of at least 50%. Suitable monoamines include linear and/or branched aliphatic amines preferably having 4 to 20 carbon atoms, such as aminobutane, hexylamine, octylamine, dodecylamine and the fatty amines, such as stearylamine. If monoamines are employed, they are preferably employed in a mixture with the abovementioned diamines and/or polyamines, the mixture preferably containing a proportion by mass of up to 20% of monoamines and at least 80% of di- and/or polyamines.

By mixing in aromatic hydroxy acids with the present hardener, inter alia, it is possible to shorten the pot life. In addition, the pendulum hardness of systems modified with the present hardener rises at a low temperature setting much faster than in the absence of such modification. Suitable aromatic hydroxy acids include mono- and polycyclic acids comprising at least one carboxyl group and at least one hydroxyl group. Preference is given to the use of hydroxybenzoic acids, such as salicylic acid and p-hydroxybenzoic acid, and also 2,3-, 2,6- and 1,8-hydroxynaphthoic acid. Salicylic acid is particularly preferred. The hydroxy acid may be preferably added in proportions by mass of from 0.2 to 10%, most preferably from 0.5 to 8%, based on the mass of the mixture.

By mixing in primary aliphatic monoamines having 4 to 20 carbon atoms with the present hardener, inter alia, it is possible to reduce film clouding, especially at low temperatures (below about 20° C.). These amines are preferably added in proportions by mass of 0.2 to 7%, most preferably from 0.5 to 5%, based on the mass of the mixture.

The present hardeners can be used together with any customary epoxy resins commonly used for preparing curable mixtures. Any desired epoxy resin can be hardened with the present hardeners. In this context it is also possible to employ the epoxy resins from which epoxy resin (A) is selected. Preference may also be given to use of the present hardeners together with the epoxy resins selected from resins derived from bisphenol A and bisphenol F and mixtures thereof. Use may also be made here of mixtures of component (A) and other epoxy resins, for example those based on bisphenol A, bisphenol F or mixtures thereof. Advantageously, the epoxy resin that is to be cured can optionally be employed as a solution in a solvent such as benzyl alcohol.

The epoxy resin systems which comprise the present hardeners lead to particularly chemical-resistant coatings which can, for example, be applied as a coating material to substrates such as metals, especially iron, steel, aluminum and nonferrous metals, plastics, glass, porcelain, concrete, plasters, wood and cardboard. Their use as a topcoat on other coatings is also possible.

The invention is further described by the following examples. The examples are for illustration purposes only, and do not limit the scope of the invention.

EXAMPLE 1

626 g of ®Epikote 155 (novolak glycidyl ether, Shell, functionality about 3.5) with a specific epoxide group content (SEC) of 5680 mmol/kg (epoxide equivalent "EV" of 176 g/mol) and 140 g of phenol (M=94.11 g/mol) are heated under nitrogen to 120° C. in a four-necked flask fitted with stirrer, thermometer and condenser. Then 2.03 g of triphenylphosphine are added. By exothermic reaction the temperature then rises over the course of 10 minutes to 165° C.; it is kept at 160° C. for a further 3.4 hours, until the specific epoxide group content is 2810 mmol/kg (EV 356 g/mol), and the reaction product is diluted with 250 g of benzyl alcohol. After cooling to room temperature, the specific epoxide group content is 2105 mmol/kg (EV 475 g/mol) and the viscosity at 25° C. is 12,205 mPas.

EXAMPLE 2

20 g of benzyl alcohol and 374 g of m-xylylenediamine (M =136.1 g/mol; specific content of amine hydrogen atoms (SHC) 29.4 mol/kg; molar mass divided by the number of amine hydrogen atoms "HAV"=34 g/mol) are charged under nitrogen to a four-necked flask fitted with stirrer, thermometer and condenser and are heated to 80° C. Then 406 g of the epoxy resin solution from Example 1 are added at 80° C. over the course of 2 hours, and the mixture is held at this temperature for 2.5 hours. The hardener, cooled to room temperature, has an amine number of 383 mg/g and a viscosity at 25° C. of 3866 mPas. (The amine number (measured in mg/g) is the ratio of that mass of potassium hydroxide $M_{KOH}$, in mg, which in being neutralized consumes the same amount of acid as a mass $M_B$ of the substance which is to be characterized to the mass $m_B$ of this substance in g.) The specific content of amine hydrogen atoms is 12.7 mol/kg (calculated; HAV =78.8 g/mol).

EXAMPLE 3

Example 1 is repeated, with the exception that the mixture is kept at 160° C. for 4 hours; the epoxy resin solution has a specific epoxide group content of 2041 mmol/kg (EV of 490 g/mol) and a viscosity at 25° C. of 15,170 mPas.

EXAMPLE 4

Example 2 is repeated with the epoxy resin from Example 3. The hardener has an amine number of 385 mg/g and a viscosity at 25° C. of 4250 mPas. The specific content of amine hydrogen atoms is 12.7 mol/kg (calculated; HAV= 78.8 g/mol).

EXAMPLE 5

110 g of m-xylylenediamine (M=136.1 g/mol; specific content of amine hydrogen atoms 29.4 mol/kg; molar mass divided by the number of amine hydrogen atoms "HAV"=34 g/mol) are charged under nitrogen to a four-necked flask fitted with stirrer, thermometer and condenser and are heated to 80° C. Then 120 g of the epoxy resin solution from Example 3 are added at 80° C. over the course of 2 hours, and the mixture is held at this temperature for 2.5 hours. Then, when the reaction is over, 6 g of octylamine are added and are stirred in homogeneously. The hardener, cooled to room temperature, has an amine number of 390 mg/g and a viscosity at 25° C. of 3575 mPas. The specific content of amine hydrogen atoms is 13.1 mol/kg (calculated; HAV= 76.5 g/mol).

EXAMPLE 6

24 g of benzyl alcohol and 267 g of m-xylylenediamine are charged under nitrogen to a four-necked flask fitted with stirrer, thermometer and condenser and are heated to 80° C. Then 200 g of the epoxy resin solution from Example 3 are added at 80° C. over the course of 2 hours, and the mixture is held at this temperature for 2 hours. The hardener, cooled to room temperature, has an amine number of 449 mg/g and a viscosity at 25° C. of 630 mPas. The specific content of amine hydrogen atoms is 15.2 mol/kg (calculated; HAV= 65.9 g/mol).

EXAMPLE 7

626 g of ®Epikote 155 (specific epoxide group content 5682 mmol/kg; EV 176 g/mol) and 254 g of o-phenylphenol (M=170.21 g/mol) are heated under nitrogen to 120° C. in a four-necked flask fitted with stirrer, thermometer and condenser. Then 2.33 g of triphenylphosphine are added. By exothermic reaction the temperature then rises over the course of 20 minutes to 170° C.; it is kept at 160° C. for a further 3 hours, until the specific epoxide group content is 2519 mmol/kg (EV 397 g/mol), and then the reaction product is diluted with 287 g of benzyl alcohol. After cooling to room temperature, the specific epoxide group content is 1862 mmol/kg (EV 537 g/mol) and the viscosity at 25° C. is 22,903 mPas.

EXAMPLE 8

20 g of benzyl alcohol and 374 g of m-xylylenediamine (M=136.1 g/mol; specific content of amine hydrogen atoms 29.4 mol/kg; molar mass divided by the number of amine hydrogen atoms "HAV"=34 g/mol) are charged under nitrogen to a four-necked flask fitted with stirrer, thermometer and condenser and are heated to 80° C. Then 406 g of the epoxy resin solution from Example 7 are added at 80° C. over the course of 2 hours, and the mixture is held at this temperature for 2.5 hours. The hardener, cooled to room temperature, has an amine number of 387 mg/g and a viscosity at 25° C. of 2895 mPas. The specific content of amine hydrogen atoms is 12.8 mol/kg (calculated; HAV= 78.1 g/mol).

EXAMPLES 9–12

See Table I

| Epoxy resins | |
|---|---|
| ®Beckopox EP 140 Bisphenol A epoxy resin liquid standard EP resin | SEC 5525 mmol/kg EV 181 g/mol |
| ®Beckopox EP 128 Low-viscosity (reactively diluted) bisphenol A EP resin | SEC 5263 mmol/kg EV 190 g/mol |
| Epoxy resin hardeners | |
| ®Beckopox-Spezialharter VEH 2841 Modified, accelerated epoxy adduct hardener | SHC 10.5 mol/kg HAV 95 g/mol |
| ®Beckopox-Spezialharter EH 624 Low-phenol, modified Mannich base hardener | SHC 12.5 mol/kg HAV 80 g/mol |
| ®Beckopox-Spezialharter VEH 2621 Modified, accelerated epoxy adduct hardener | SHC 8.8 mol/kg HAV 113 g/mol |

Preparing the films

In accordance with the proportions indicated in Table 2, resin and hardener are stirred together homogeneously and applied as a 250 µm film to glass plates, which are cured at the stated temperatures and tested.

Chemical resistance test

20±0.1 g of the mixture of resin and hardener are weighed out in accordance with the mixing proportions, stirred slowly with a spatula for 3 to 5 minutes (no air bubbles), and poured into a cylindrical mold with a diameter of 70 mm. The mass is cured at room temperature for at least 24 hours and then at 60° C. for 5 hours. The plate with a thickness of about 4 mm is demolded, weighed (analytical balance) and placed in the medium. In this context it is necessary for the molding to be completely covered by the liquid throughout the storage period. The parameter determined is the increase in weight, relative to the initial value, in % after 24 h. This is always done using the same procedure (comparability). Here, the samples are removed, dried with fluff-free cellulose wadding, left in the air for 10 minutes and then weighed immediately (and then replaced in the medium if the increases in weight are to be monitored for longer periods of time).

Assessment of the film test (Table 2)

The hardeners of Examples 14 and 17 exhibit a longer processing time and markedly improved film properties (less clouding, considerably improved pendulum hardness) relative to the comparison (Example 13) at room temperature and at +6° C.

Examples 15 and 18 (salicylic acid-modified) correspond in the amount of hardener to Examples 14 and 17; in the comparison, the addition of salicylic acid again reduces the processing time, thus providing the possibility of establishing desired intermediate values in the processing time. While the pendulum hardnesses at room temperature are reduced slightly relative to Examples 14 and 17, at 6° C. they are markedly higher than the pendulum hardnesses obtained with the unmodified hardeners.

Examples 16 and 19 (octylamine-modified) show relative to Examples 14 and 17 a processing time which is again at the same level; similarly, the pendulum hardnesses at room temperature and 6° C. are at the same level as that of the comparison examples. Film clouding at 5° C. has undergone an advantageous change with respect to the comparison examples.

Assessment of the chemical resistance test

From Examples 22 to 24 it is evident that the increases in weight in all media are less than in the Comparison Example 21 (epoxy-amine adduct hardener) and, with the exception of the 10% strength acetic acid medium, produce results which are at least equivalent to those of the Comparison Example 20 (Mannich base hardener). The novel hardeners thus bring about a surprisingly high chemical resistance in the resin compositions cured using them. See Table 3.

The priority document German application No. 196 31 370.8, filed Aug. 2, 1996 is incorporated herein in its entirety by reference including the title, abstract, specification, claims and any figures and/or tables.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

TABLE 1

HARDENER COMPOSITIONS
(Proportions by mass in % = g/100 g)

| Example | 9 | 10 | 11 | 12 |
|---|---|---|---|---|
| Hardener of Example 2 | 95.2 | 97.5 | — | — |
| Hardener of Example 8 | — | — | 95.2 | 97.5 |
| Salicylic acid | 4.8 | — | 4.8 | — |
| Octylamine | — | 2.5 | — | 2.5 |
| Total mass | 100.0 | 100.0 | 100.0 | 100.0 |
| SHC in mol/kg | 12.1 | 12.8 | 12.2 | 12.8 |
| HAV in g/mol | 82.7 | 78.3 | 82.0 | 78.1 |

TABLE 2

FILM TESTS

| Example | | 13 (comparison) | 14 | 15 | 16 | 17 | 18 | 19 |
|---|---|---|---|---|---|---|---|---|
| Beckopox EP 128 | parts | 100.0 | 100.0 | 100.0 | 100.0 | 100.0 | 100.0 | 100.0 |
| Beckopox-Spezialhärter VEH 2841 | parts | 50.0 | | | | | | |
| Hardener of Example 2 | parts | | 41.5 | | | | | |
| Hardener of Example 9 | parts | | | 43.5 | | | | |
| Hardener of Example 10 | parts | | | | 41.2 | | | |
| Hardener of Example 8 | parts | | | | | 41.1 | | |
| Hardener of Example 11 | parts | | | | | | 43.2 | |
| Hardener of Example 12 | parts | | | | | | | 41.1 |
| 23° C.: | | | | | | | | |
| Processing time | min | 23 | 46 | 26 | 43 | 49 | 26 | 46 |
| Film clouding | (+) | 2 | 0–1 | 1 | 0–1 | 0–1 | 0–1 | 1 |
| Pendulum hardnesses after 24 hours | s | 110 | 197 | 185 | 182 | 203 | 197 | 202 |
| Hot water resistance after 7 days | (+) | 0 | 0 | 0 | 0 | 0 | 0 | 0 |
| 6° C.; 50 % rel. atmospheric humidity: | | | | | | | | |
| Film clouding | (+) | 1–2 | 0–1 | 1 | 0 | 1 | 0–1 | 0–1 |
| Pendulum hardnesses after 24 hours | s | 18 | 30 | 38 | 28 | 32 | 48 | 38 |
| Hot water resistance after 7 days | (+) | 0–1 | 0–1 | 0–1 | 0–1 | 0–1 | 0–1 | 0–1 |

(+) visual assessment in accordance with DIN 53230

TABLE 3

CHEMICAL RESISTANCE TEST
Percentage increase in weight of the moldings after 24 hours

| Example | | 20 | 21 | 22 | 23 | 24 |
|---|---|---|---|---|---|---|
| Initial weight of Beckopox EP 140 | g | 111.0 | 98.5 | 111.5 | 112.5 | 117.3 |
| Hardeners employed | | EH 624 (comparison) | VEH 2621 (comparison) | Example 4 | Example 5 | Example 6 |
| HAV | g/mol | 80.0 | 113.0 | 78.7 | 76.5 | 65.9 |
| SHC | mol/kg | 12.5 | 8.8 | 12.7 | 13.1 | 15.2 |
| Initial weight of hardener | g | 49.0 | 61.5 | 48.5 | 47.5 | 42.7 |
| Acetic acid 10% | | 0.22 | 0.60 | 0.31 | 0.41 | 0.35 |
| Ethyl acetate | | 0.27 | 1.50 | 0.16 | 0.25 | 0.27 |
| Premium-grade gasoline | | 0.02 | 0.03 | 0.01 | 0.01 | 0.01 |
| Xylene | | 0.05 | 0.07 | 0.04 | 0.05 | 0.06 |
| Hydrochloric acid 10% | | 0.14 | 0.23 | 0.13 | 0.14 | 0.13 |
| Deionized water | | 0.09 | 0.18 | 0.09 | 0.10 | 0.08 |
| Lactic acid 5% | | 0.12 | 0.23 | 0.14 | 0.12 | 0.15 |

What is claimed is:

1. A hardener for epoxy resins, comprising a reaction product of
   (A) a compound having an average of at least one 1,2-epoxide group per molecule of compound (A), said compound (A) being a reaction product of
      (A1) a polyfunctional epoxide having at least two 1,2-epoxide groups per molecule of the epoxide and
      (A2) a monohydroxyaromatic compound, and
   (B) an amine.

2. A hardener as claimed in claim 1, wherein component (A1) comprises a glycidyl ether of a novolak having at least two glycidyl ether groups.

3. A hardener as claimed in claim 2, wherein the novolak has at least two hydroxyl groups.

4. A hardener as claimed in claim 1, wherein the monohydroxyaromatic compound (A2) is selected from the group consisting of monocyclic hydroxyaromatic compounds.

5. A hardener as claimed in claim 1, wherein phenol is employed as component (A2).

6. A hardener as claimed in claim 1, wherein an at least monosubstituted phenol is employed as component (A2), said phenol having at least one substituent selected from the group consisting of linear and branched alkyl radicals having 1 to 20 carbon atoms, linear and branched alkoxy radicals having 1 to 8 carbon atoms and aryl radicals which are substituted by alkyl and/or alkoxy radicals that can be linked to the phenol by way of a direct bond or an ether, thioether, carbonyl, sulfonyl, alkylene, carboxamide or carbonyloxy bridge.

7. A hardener as claimed in claim 1, wherein components (A1) and (A2) are employed in amounts such that component (A) has an average from 1.3 to 2.7 epoxide groups per each molecule of compound (A).

8. A hardener as claimed in claim 1, wherein the amine (B) is selected from the group consisting of amines having at least one primary amino group which is attached to an aliphatic carbon atom.

9. A hardener as claimed in claim 1, wherein the amine (B) is selected from the group consisting of amines having at least one primary amino group and at least one secondary amino group, each of which is attached to an aliphatic carbon atom.

10. A hardener as claimed in claim 1, wherein the amine (B) is selected from the group consisting of amines having at least two primary amino groups, each of which is attached to an aliphatic carbon atom.

11. A hardener as claimed in claim 1, wherein the amine (B) is a polyamine that is selected from the group consisting of 1,3-bisaminomethylbenzene, isophoronediamine, aminoethylpiperazine, and mixtures of one or more 1,3-bisaminomethylbenzene, isophoronediamine, and aminoethylpiperazine with or without a diprimary amine.

12. A hardener as claimed in claim 1, further comprising salicylic acid.

13. A hardener as claimed in claim 1, further comprising in addition to amine (B) aliphatic monoamine having 4 to 20 carbon atoms.

14. A method for preparing curable mixtures comprising mixing a hardener as claimed in claim 1 with an epoxy resin.

15. A method for preparing coating formulations comprising mixing a hardener as claimed in claim 1 with an epoxy resin.

16. A curable mixture comprising a hardener as claimed in claim 1 and an epoxy resin.

17. A curable mixture as claimed in claim 16, wherein said epoxy resin comprises a compound having an average of at least one 1,2-epoxide group per molecule of compound (A), said compound (A) being a reaction product of
   (A1) a polyfunctional epoxide having at least two 1,2-epoxide groups per molecule of the epoxide and
   (A2) a monohydroxyaromatic compound.

18. A curable mixture as claimed in claim 16, wherein said epoxy resin comprises a compound having an average of at least one 1,2-epoxide group per molecule of compound (A), said compound (A) being a reaction product of
   (A1) a polyfunctional epoxide having at least two 1,2-epoxide groups per molecule of the epoxide and
   (A2) a monohydroxyaromatic compound,
which has been dissolved in benzyl alcohol.

19. A hardener for epoxy resins, comprising a reaction product of a mixture of
   (A) a compound having an average of at least one 1,2-epoxide group per molecule of compound (A), said compound (A) being a reaction product of
      (A1) a polyfunctional epoxide having at least two 1,2-epoxide groups per molecule of said epoxide (A1) and
      (A2) a monohydroxyaromatic compound with (A') an epoxide compound which is different from (A) and has at least two 1,2-epoxide groups per molecule of said compound (A'), and (B) an amine.

20. A hardener as claimed in claim 19, wherein said compound (A') is selected from the group consisting of glycidyl ethers of bisphenol A and bisphenol F and reaction products of said glycidyl ethers with bisphenol A or bisphenol F, said compound (A') having a specific epoxide group content of from 4500 to 6000 mmol/kg.

* * * * *